US011912244B1

(12) United States Patent
Lagina et al.

(10) Patent No.: US 11,912,244 B1
(45) Date of Patent: Feb. 27, 2024

(54) SYSTEMS AND DEVICES FOR MATERIAL REMOVAL FROM A WIPER

(71) Applicant: Wiper Shaker, LLC, Traverse City, MI (US)

(72) Inventors: Martin Lagina, Traverse City, MI (US); Bart Hautala, Lake Ann, MI (US)

(73) Assignee: Wiper Shaker, LLC, Traverse City, MI (US)

( * ) Notice: Subject to any disclaimer, the term of this patent is extended or adjusted under 35 U.S.C. 154(b) by 0 days.

(21) Appl. No.: 18/306,606

(22) Filed: Apr. 25, 2023

Related U.S. Application Data

(60) Provisional application No. 63/378,319, filed on Oct. 4, 2022.

(51) Int. Cl.
   *B60S 1/04* (2006.01)
(52) U.S. Cl.
   CPC .................... *B60S 1/0477* (2013.01)
(58) Field of Classification Search
   CPC .... B60S 1/0477; B60S 1/0483; B60S 1/0497; B60S 1/06; B60S 3/048
   USPC ....................................................... 15/250.19
   See application file for complete search history.

(56) References Cited

U.S. PATENT DOCUMENTS

| 5,070,571 | A | * | 12/1991 | Arai | B60S 1/08 |
| | | | | | 15/250.001 |
| 5,867,858 | A | * | 2/1999 | Kelly | B60S 1/3411 |
| | | | | | 15/250.19 |
| 5,900,821 | A | * | 5/1999 | Petzold | B60S 1/0825 |
| | | | | | 340/602 |
| 6,129,093 | A | | 10/2000 | Kelly | |
| 9,493,141 | B2 | * | 11/2016 | Schmid | B60S 1/3805 |
| 2016/0031419 | A1 | * | 2/2016 | Nelson | B60S 1/482 |
| | | | | | 451/41 |

* cited by examiner

*Primary Examiner* — Tom Rodgers
(74) *Attorney, Agent, or Firm* — Aurora Consulting LLC; Ashley Sloat; Ty F. Davis

(57) ABSTRACT

The present disclosure is directed to methods and devices for material removal from a wiper. Embodiments included a wiper attached assembly comprising a vibration mechanism configured to dislodge or decouple accumulated debris or residue from a wiper. Power for the vibration mechanism may be supplied from a battery within the wiper attachment assembly or supplied from a vehicle that the system is installed upon. Activation of the present wiper attachment assembly may be manual, autonomous, or a combination thereof. Control inputs may be hardwired into a microcontroller of the wiper attachment assembly or received wirelessly from an input device. Additionally, the present invention discloses material selection and manufacturing considerations of critical components such as the top cover.

20 Claims, 8 Drawing Sheets

SYSTEMS AND DEVICES FOR MATERIAL REMOVAL FROM A WIPER

CROSS-REFERENCE TO RELATED APPLICATIONS

This application claims the priority benefit of U.S. Provisional Patent Application Ser. No. 63/378,319, filed Oct. 4, 2022, which is herein incorporated by reference in its entirety.

INCORPORATION BY REFERENCE

All publications and patent applications mentioned in this specification are herein incorporated by reference in their entirety, as if each individual publication or patent application was specifically and individually indicated to be incorporated by reference in its entirety.

TECHNICAL FIELD

This disclosure relates generally to the field of vehicle components or assemblies, and more specifically to the field of vehicle components for maintaining a clear line of sight. Described herein are systems and devices for material removal from a wiper.

BACKGROUND

Virtually all vehicles today (cars, trucks, trains, airplanes, boats, etc.) incorporate one or more windshield wipers which can be activated at any time by a driver to sweep repeatedly across an exterior surface of the windshield. A rubber or plastic wiper blade of each wiper assembly engages the exterior surface of the windshield to clear debris from that portion of the windshield generally in front of the driver to maintain a line of sight of the driver. Debris left to build up on the windshield impairs visibility for the driver and, if permitted to build up anywhere on the wiper assembly, can also reduce wiping efficiency. Maintaining good visibility for the driver lessens the chances of the vehicle becoming involved in an accident and hence increases the safety level for all occupants.

The type of debris which can accumulate depends on the geographical location and season. In locations that experience winter, snow and ice buildup on wiper blades is a common experience. In extreme weather conditions, it is not uncommon for snow or ice to freeze to a windshield wiper arm and/or wiper blade. While allowing for movement of the blade across the windshield, such frozen debris may seriously reduce the cleaning action of the blade on the windshield surface. Such freezing may occur while a vehicle is being driven or when stationary. Also, it is common for lumps of ice or snow to become merely trapped under a wiper blade during use so as to be carried with the blade during its wiping movement. This situation may occur if the blade, in moving across the windshield surface, is caused to ride onto a frozen mass, i.e., of ice or snow, and move it from a stationary location upon the windshield. The trapped frozen mass is thus not frozen either to the windshield or to the wiper blade assembly.

As long as the frozen mass remains merely trapped, the efficiency of the wiper blade is severely reduced as a significant portion or all of the wiper blade can no longer engage the exterior surface of the windshield. The thickness of this frozen mass may have a bearing on the wiping efficiency, especially if the mass extends along a significant length of the blade. Ice lumps as small as one millimeter, if so trapped, can cause the wiper to experience reduced efficiency. Snow and/or ice formation anywhere on the windshield wiper assembly may contribute to reducing wiping efficiency also by raising sections of the blade off the windshield.

Similar to ice and snow situations, debris from trees (e.g., leaves, needles, seeds, etc.) may become lodged under or entangled with the wiper blade, causing line of sight issues if not removed. Still further, vehicles navigating constructions zones or locations having massive mud puddles may get mud, dirt, and the like on the windshield. Aggregates or clods of this debris may similarly become lodged under the wiper blade causing line of sight issues.

A driver of a vehicle, when experiencing any of the problems discussed above, generally has two options. The first and safest option is to stop the vehicle and, even in extremely cold or dangerous conditions (bridges, no shoulder roadways, low visibility weather, etc.), exit the vehicle to manually remove the material or debris trapped underneath the wiper blade. This is not always convenient and is certainly not possible for pilots and train operators.

A common, although unrecommended, solution for many drivers is to open a window and manually attempt to grasp a windshield wiper as it travels within extended reach of the driver. In reaching the wiper, the driver attempts to lift it momentarily from the windshield in the hope that the debris will become dislodged. Needless to say, this is an extremely unsafe practice and, in many cases, such as for larger vehicles, e.g., trains and airplanes, is simply not an option.

Accordingly, there exists a new for new systems and devices that may assist in debris or material removal from a wiper.

SUMMARY

In some aspects, the techniques described herein relate to a system for removing material from a wiper blade, the system including: a housing including: a top cover defining a passage extending from the top cover, wherein the passage defines a lumen, a base including a securing mechanism for at least a portion of a vibration mechanism, wherein the base defines a base aperture that is configured to align with the lumen of the passage when the base is coupled to the top cover, and a bottom cover coupled to the base and the top cover, wherein the coupling between the bottom cover and the top cover includes a water-tight seal; the vibration mechanism configured to be contained in the housing and including an electrical connection that extends from the vibration mechanism through the base aperture and the lumen of the passage in the top cover to a power source; and a control device including: an antenna configured to receive an input signal, a microcontroller configured to process the input signal, and to output a change in an operating state of the vibration mechanism, and the power source being in electrical communication with the vibration mechanism via the electrical connection, the antenna, and the microcontroller.

In some aspects, the techniques described herein relate to a system, wherein the vibration mechanism includes a motor and an eccentric rotating mass.

In some aspects, the techniques described herein relate to a system, wherein the vibration mechanism includes one of: a linear resonant actuator, a solenoid actuator, or a piezoelectric element.

In some aspects, the techniques described herein relate to a system, further including a user input device configured to generate the input signal.

In some aspects, the techniques described herein relate to a system, wherein the user input device includes a remote, a key fob, or a mobile computing device including an application installed thereon.

In some aspects, the techniques described herein relate to a system, wherein the operating state includes one of: activating the vibration mechanism, deactivating the vibration mechanism, or changing a frequency of vibration caused by the vibration mechanism.

In some aspects, the techniques described herein relate to a system, further including a clamp configured to secure the housing to a wiper arm coupled to the wiper blade.

In some aspects, the techniques described herein relate to a system, wherein the clamp is coupled to the bottom cover opposite an end of the bottom cover that is coupled to the top cover.

In some aspects, the techniques described herein relate to a system, wherein the base includes a first concave side including the securing mechanism and a second side, opposite the first concave side, coupled to the bottom cover.

In some aspects, the techniques described herein relate to a system, wherein the securing mechanism includes one or more of: a plurality of stanchions, an adhesive, or a keyed interface complementary to a shape of the vibration mechanism configured to secure the at least a portion of the vibration mechanism to the base.

In some aspects, the techniques described herein relate to a system, wherein the power source includes a battery.

In some aspects, the techniques described herein relate to a system for removing material from a wiper blade, the system including: a housing including: a top cover defining a passage connected to a conduit extending from the top cover, and a base including a securing mechanism for at least a portion of a vibration mechanism, wherein the base defines a base aperture that is configured to align with the passage connected to the conduit when the base is coupled to the top cover, and wherein the base is configured to be coupled to the top cover; the vibration mechanism configured to be contained in the housing and including an electrical connection that extends from the vibration mechanism through the base aperture and the passage in the top cover and through the conduit in the top cover to a power source; an antenna configured to receive an input signal from a user input device; a microcontroller configured to process the input signal from the user input device, and to output a change in an operating state of the vibration mechanism; and the power source in electrical communication with the vibration mechanism via the electrical connection of the vibration mechanism, the antenna, and the microcontroller.

In some aspects, the techniques described herein relate to a system, wherein the vibration mechanism includes a motor and an eccentric rotating mass.

In some aspects, the techniques described herein relate to a system, wherein the vibration mechanism includes one of: a linear resonant actuator, a solenoid actuator, or a piezoelectric element.

In some aspects, the techniques described herein relate to a system, further including the user input device.

In some aspects, the techniques described herein relate to a system, wherein the user input device includes a remote, a key fob, or a mobile computing device including an application installed thereon.

In some aspects, the techniques described herein relate to a system, wherein the operating state includes one of: activating the vibration mechanism, deactivating the vibration mechanism, or changing a frequency of vibration caused by the vibration mechanism.

In some aspects, the techniques described herein relate to a system, further including a clamp configured to secure the housing to a wiper arm coupled to the wiper blade.

In some aspects, the techniques described herein relate to a system, wherein the clamp is coupled to the base opposite an end of the base that is coupled to the top cover.

In some aspects, the techniques described herein relate to a system, wherein the securing mechanism includes one or more of: a plurality of stanchions, an adhesive, or a keyed interface complementary to a shape of the vibration mechanism configured to secure the at least a portion of the vibration mechanism to the base.

In some aspects, the techniques described herein relate to a system, wherein the power source includes a solar harvesting panel coupled to a battery configured to store energy and discharge the stored energy.

In some aspects, the techniques described herein relate to a system, further including a sensor disposed on or integrated in the housing and in electrical communication with the microcontroller, wherein the sensor is configured to detect moisture; and output a sensor signal to the microcontroller.

In some aspects, the techniques described herein relate to a system, wherein the microcontroller is configured to receive a sensor signal from the sensor; and automatically output an activation signal to the vibration mechanism.

In some aspects, the techniques described herein relate to a system, wherein the sensor is an electromagnetic sensor or an electrical resistance sensor.

In some aspects, the techniques described herein relate to a device for removing material from a wiper blade, the device being securable to a wiper arm coupled to the wiper blade, the device including: a housing including: a top cover defining a passage connected to a conduit extending from the top cover, a base including a securing mechanism for at least a portion of a vibration mechanism, wherein the base defines a base aperture that is configured to align with the passage connected to the conduit when the base is coupled to the top cover, and a bottom cover coupled to the base and the top cover, wherein the coupling between the bottom cover and the top cover includes a water-tight seal; the vibration mechanism being contained in the housing and including an electrical connection that extends from the vibration mechanism through the base aperture and the passage in the top cover and through the conduit in the top cover to a power source; and a clamp configured to secure the housing to the wiper arm.

In some aspects, the techniques described herein relate to a device, wherein the clamp is coupled to the bottom cover opposite an end of the bottom cover that is coupled to the top cover.

In some aspects, the techniques described herein relate to a device, wherein the base includes a first concave side including the securing mechanism and a second side, opposite the first concave side, coupled to the bottom cover.

In some aspects, the techniques described herein relate to a device, further including a power source.

BRIEF DESCRIPTION OF THE DRAWINGS

The foregoing is a summary, and thus, necessarily limited in detail. The above-mentioned aspects, as well as other aspects, features, and advantages of the present technology are described below in connection with various embodiments, with reference made to the accompanying drawings.

Figure 1:
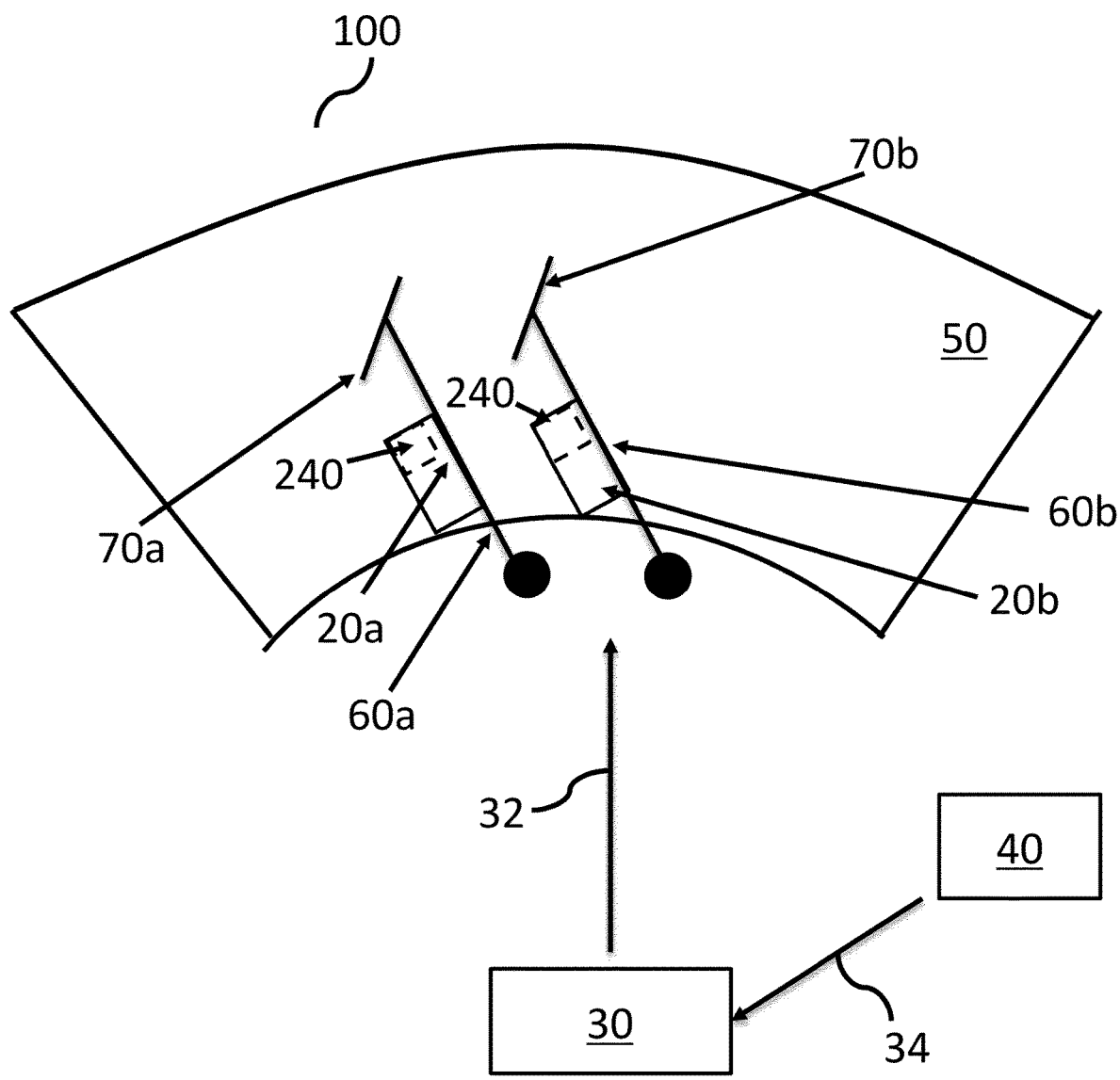
FIG. 1 illustrates an embodiment of a system for material removal from a wiper.

The illustrated embodiments are merely examples and are not intended to limit the disclosure. The schematics are drawn to illustrate features and concepts and are not necessarily drawn to scale.

DETAILED DESCRIPTION

The foregoing is a summary, and thus, necessarily limited in detail. The above-mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the contemplated invention(s). Other embodiments may be utilized, and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

Conventional devices, that vibrated the wiper blade to remove material, suffered from a few drawbacks. First, these devices had a tube-like design that served as a sealing tube and entrance to the inside of the assembly for the power connections. The tube-like design would become clogged during the powder coating process. Because the device would frequently become clogged, installing the device onto the wiper arms and threading the connections through the device would be a very difficult and lengthy process. To fix the issue, one could mount the device in a drill press and drill out the tubes, but this would often result in breaking the entire device in the process.

Further, conventional devices required running the power and ground connections through the firewall of the vehicle. At minimum, this makes people uncomfortable and at most, this is difficult for a majority of people, requiring expensive, professional installation.

Additionally, conventional devices required manual operation and do not have the capability of autonomous control based on time intervals, conventional input, climatic inputs, performance input, or any combination of the foregoing.

Disclosed herein are systems and devices that solve the above-mentioned technical problems. The top cover described herein includes a more appropriate construction material. The top cover is more flexible and forgiving during manipulation of the wires into and through the conduit, is not powder coated, and does not need drilling. The top cover maintains the wires under the hood and, for installation, is simpler since it includes connecting power and ground to the vehicle's battery without needing wires to be routed through the vehicle's firewall or threaded through a powder coating plugged sealing tube. Further, wireless integration of the system with the car allows a user to optionally press a button on an input device to actuate the system or device instead of pushing a button installed on the dash. This configuration is easier for users to install (since the vehicle's firewall is not breached) and easier to activate from any location within a predefined distance of the vehicle.

Described herein are devices, systems, and methods for removing material from a wiper blade. Removing material may include material falling off, being shaken off, etc.

Debris that may be removed may include snow, ice, mud, plant debris, etc.

A vehicle in which the systems and devices may be implemented may be a commercial vehicle, transport vehicle (e.g., semi, etc.), personal vehicles, equipment, aircraft, etc.

Systems and Devices

The systems and devices described herein function to remove material from a wiper blade. The systems and devices described herein are used for the automotive industry, but can additionally, or alternatively, be used for any suitable applications, clinical or otherwise. The systems and devices can be configured and/or adapted to function for any suitable system utilizing screens, windshields, windows, or the like.

FIG. 1 illustrates an embodiment of a system 100 for material removal from a wiper. FIG. 1 shows a schematic of a windshield 50 with a first windshield wiper blade 70a and a second windshield wiper blade 70b that are actuated by windshield wiper arms 60a, 60b, respectively. Although two windshield wiper blades are shown, it shall be appreciated that the systems and devices described herein may be utilized on one windshield wiper arm and connected blade or a plurality of windshield wiper arms and connected blades. The illustrated embodiment includes a first wiper attachment device 20a and a second wiper attachment device 20b attached to the windshield wiper arms 60a, 60b, respectively. When removing material from the respective windshield wiper blades 70a, 70b, the wiper attachment device 20a, 20b may activate a vibration mechanism of the wiper attachment device 20.

The wiper attachment devices 60a, 60b are in electrical communication with a control device 30 via transmission line 32. The transmission line 32 may be an electrical wire harness for the transmission of electrical power to the electric motors of the wiper attachment devices 60a, 60b. Additionally, control device 30 is in wireless communication with an input device 40. The input device 40 may comprise a remote device such as a key fob, remote, application running on a computing device (e.g., remote computing device, mobile computing device, server, desktop, workstation, etc.), or the like. Wireless transmission between the input device 40 and the control device 30 may use any suitable methods and/or devices known in the art (e.g., Wi-Fi, Zigbee, RFID, Bluetooth®, NFC, or etc.).

Figure 2:
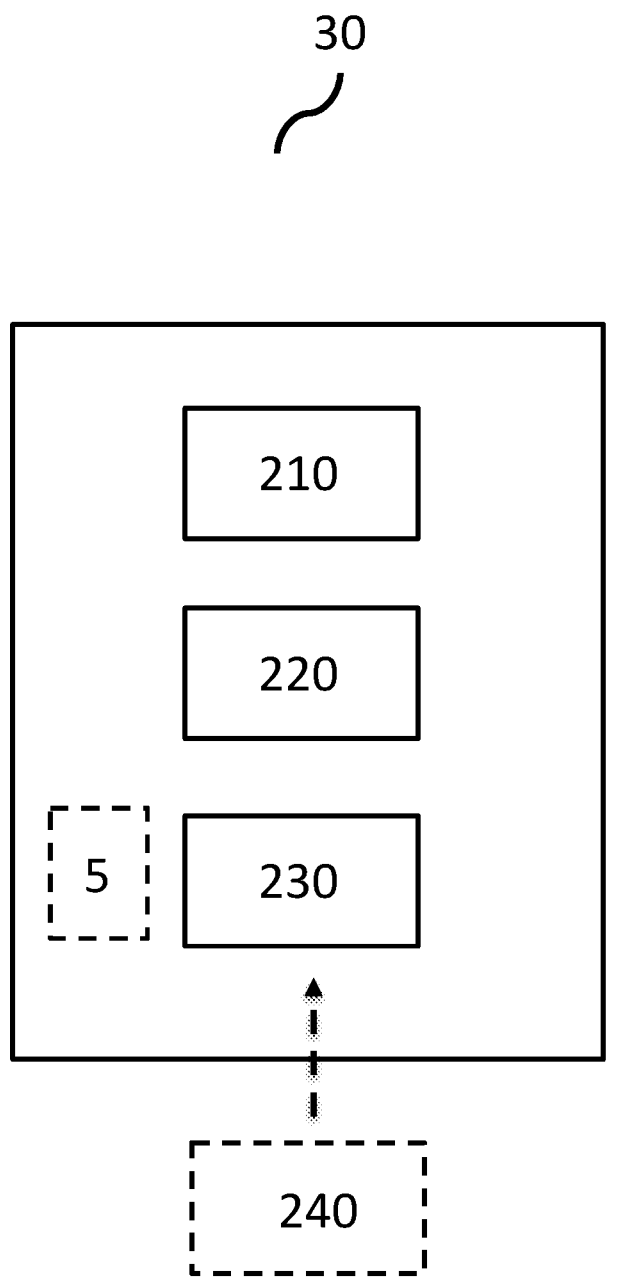
FIG. 2. Illustrates an embodiment of a control device of a system for material removal from a wiper.

FIG. 2 illustrates an embodiment of the control device 30. The control device 30 may utilize an antenna 210 or coil for receiving one or more wireless signals from the input device 40. A microcontroller 220 electrically coupled to antenna 210 receives input signals from the input device 40 and outputs an activation signal to one or more wiper attachment devices 20. The microcontroller 220 may include a microprocessor, RAM, programmable ROM, flash memory, timers, signal generators, an analog to digital converter, and/or parallel and/or serial I/O.

One or more optional (shown via dashed lines) auxiliary sensors 240 may also be in electrical communication with microcontroller 220, as shown in FIGS. 1 and 2. Optional auxiliary sensors 240 may be coupled or integrated into control device 30, coupled to, disposed on, or integrated into wiper attachment device 20 (shown in FIG. 1), a housing of a wiper attachment device 20 (shown in FIG. 1), or otherwise electrically or wirelessly coupled to microcontroller 220. Microcontroller 220 receives one or more sensor signals from the one or more auxiliary sensors 240, processes the one or more sensor signals (e.g., filters, digitizes, normalizes, etc.), and outputs a processed signal to the wiper attachment device 60, as will be described elsewhere herein. Outputs from the microcontroller 220 may include direct electrical power for the vibration mechanism of the wiper attachment device 60. This direct power from the microcontroller 220 may power the motor or any other drive mechanism of the vibration mechanism. It is further contemplated that the output from the microcontroller 220 may be used as a control signal to an electrical power control device 5, such as a relay (e.g., solid-state, electro-mechanical, etc.), or any other device for controlling electrical power. With the microcontroller 220 supplying a control voltage to an electrical power control device 5, the microcontroller 220 may only need to supply a small amount of power (i.e., voltage and/or current) to actuate the electrical power control device 5, which may then supply (or in further embodiments remove) at least a portion of the systems larger battery supply power.

Additionally, the control device 30 may include a power source 230. The power source 230 may be retained within the control device 30 (e.g., a battery, capacitor, or the like) or be transmitted from the vehicle battery via electrical transmission lines. The power source 230, when electrically coupled to the wiper attachment device 20, powers the vibration mechanism. In embodiments in which the power source 230 is retained within the control device 30, a solar harvesting panel may be electrically coupled to the power source 230 to restore energy consumed by the device when the solar panel is exposed to sunlight. The energy stored in the power source 230, from the solar harvesting panel, may be discharged or used for further device function. The control device 30 may activate the vibration mechanism based on a programed logic response to processed signals from the input device 40, optional auxiliary sensors 240, or both.

In an embodiment, when a control on the input device 40 is activated, the control device 30 may activate the vibration mechanism for a predefined duration or while the control on the input device 40 is engaged. For example, an input may have to be depressed on the input device 40 for the duration of the time the vibration mechanism is active.

In an embodiment, autonomous methods of activation, executed via the microcontroller 220, may include receiving sensor signals indicative of climate conditions that may result in residue accumulation on a wiper blade or arm. Sensors that measure climate conditions may include, but are not limited to, temperature sensors, pressure sensors, moisture sensors, and the like. For example, when sensors 240 measure a presence of moisture and a temperature lower than freezing, microcontroller 220 processes the sensor signals, determines that frozen debris is likely on the wiper, and outputs an activation signal to a wiper attachment device 20.

Additionally, or alternatively, optional auxiliary sensors may include sensors that measure current (e.g., magnetic sensor, hall effect sensor, etc.), acceleration (e.g., accelerometer, gyroscope, etc.), and the like. For example, a hall effect sensor (may not require the severance of electrical wires during installation) or other electrical current sensors may be placed on or in proximity to the power supply wires for the electric motors of the wiper assembly to measure electrical current supplied. Electrical current amounts may be indicators of residue accumulation or debris on the wiper or in between the wiper and the windshield. For example, the amount of torque required to actuate the wiper arm may increase or decrease if residue or debris is present. Thus, increased residue or debris may result in increased or decreased electrical current output by the control device 30. For example, if ice accumulates between the wiper and the windshield, the drag coefficient at the interface may be reduced, thus reducing the required electrical current. A further example may be if mud is accumulated between the wiper and the windshield, the drag coefficient at the interface may be increased, thus increasing the drag coefficient. If the measured electrical current profile does not align with or is not similar to the predefined residue/debris free electrical current profile, then the programmed logic of the microcontroller 220 may cause the control device 30 to activate the vibration mechanism.

Further for example, an accelerometer may be used to measure an acceleration profile of the wiper arm during actuation. When residue or debris accumulates on the wiper arms/blades, the mass of the assembly (i.e., wiper arm and wiper blade) increases and/or the drag coefficient on an outer surface of the windshield is changed, thus changing the acceleration profile of the wiper assembly. When the acceleration profile of the wiper assembly changes from a predefined debris/residue free profile, then the programmed logic of the microcontroller 220 may cause the control device 30 to activate the vibration mechanism. In another embodiment, an encoder (rotary pulse generator), proximity sensor, or photoelectric sensor may be used to measure an rpm profile of the wiper arm during actuation. A predefined rpm threshold may be sensed rpms between about 40 rpm and about 70 rpm. In a hindered state (e.g., having debris on the wiper assembly), an rpm threshold may be sensed rpms of below about 40 rpm or about 35 rpm or below about 65 rpm or about 70 rpm. When the rpm profile of the wiper assembly changes from a predefined debris/residue free profile, then the programmed logic of the microcontroller 220 may cause the control device 30 to activate the vibration mechanism.

In embodiments where electrical current profiles, acceleration profile, or any other suitable profiles are measured (e.g., by any of the sensors described herein), the predefined debris/residue free profile may be sensed by the sensors and processed by the microcontroller 220 to establish a baseline or reference profile. The debris/residue free profile may be an average of profiles measured during at least a portion of a period of the installation or during windows of time when measured sensor signals were above or below a predefined threshold. For example, a predefined temperature threshold may be a sensed temperature above about zero degrees Celcius+/−about 5 degrees.

For example, when a wiper is actuated, a profile (e.g., electrical current profile, acceleration profile, etc.), determined by the microcontroller 220, may be stored locally or remotely in memory. This profile may be measured by an accelerometer installed in the wiper attachment device 20 or on the wiper assembly, measured by a current sensor measuring from a power line to the electric motor of the wiper assembly, or any other suitable measurements from their appropriate locations. In an embodiment, one or more profiles may be averaged and compared to a baseline profile, a reference profile, or a historical profile. When there is a difference between the average profile and a baseline, reference, or historical profile, then the vibration mechanism of the respective wiper assembly may be activated as described elsewhere herein. One contemplated method of finding the difference between a previous profile (e.g., baseline, reference, historical, etc.) and the average profile may be the absolute value of the difference between the integral of the average profile function and the integral of the previous profile function. Some embodiments may use electromagnetic sensors or an electrical resistance sensor for the detection of residue/debris on the wiper assembly.

In some embodiments, the microcontroller 220 of the control device 30 can activate the vibration mechanism in the wiper attachment device 20 based on inputs received such as an indication of the vehicle starting, an unlocking of the vehicle, or other suitable inputs. In some implementations, user inputs, sensor inputs, or inputs from an input device 40 may be timestamped. The timestamp may be linked to the corresponding input or data associated with the input and stored in memory. In such embodiments, when an elapsed time between a previous activation of the vibration mechanism and a current time exceeds a predefined threshold, then the vibration mechanism of the wiper attachment device 20 may be automatically activated, for example for a predefined amount of time. As a further example, when one or more sensors detect one or more climate conditions and the vehicle is started or unlocked, then the vibration mechanism of the wiper attachment device 20 may be automatically activated, for example for a predefined amount of time.

Figure 3:
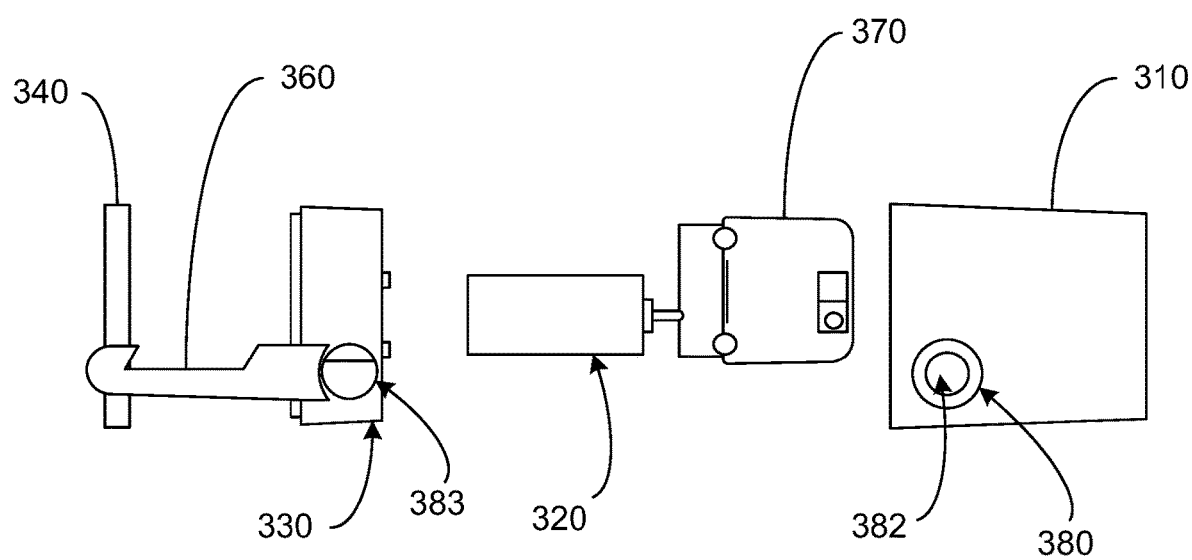
FIG. 3 shows a front exploded view of an embodiment of a device for material removal from a wiper.

FIG. 3 illustrates an embodiment of the wiper attachment device 20 assembly in an exploded view. This embodiment includes a base 330, which serves a structural support for the clamp 360 and the motor of the vibration mechanism 320. The base 330 may provide vibrational transmission, vibrational support, and/or attachment of the device to the wiper assembly via the clamp 360. The base 330 may have a first concave side comprising the securing mechanism and a second side, opposite the first side, coupled to the bottom cover. The base 330 may comprise or be formed of rigid and durable materials such as cast or forged alloys.

The clamp 360 acts as a mounting fixture for the assembly onto the wiper assembly, for example the wiper arm. The clamp 360 may be coupled to the bottom cover 340 opposite an end of the bottom cover 340 that is coupled to the top cover 310. The wiper attachment device 20 further includes a vibration mechanism. In an embodiment, the vibration mechanism includes a motor that generates vibration by spinning a weight 370, which has a center of mass located off the longitudinal axis of the output shaft of the motor (i.e., an eccentric rotating mass). This generated vibration is transferred into the wiper assembly via the clamp 360. The motor of the vibration mechanism 320 may be of any suitable voltage or voltage type variety. For example, most vehicles operate with 12-volt direct current systems, and for these applications, the motor of the vibration mechanism 320 may be used for 12-volt direct current specifications. Alternatively, the motor of the vibration mechanism 320 may be a linear resonant actuator, a solenoid actuator, or a piezoelectric element. Any of the described embodiments may supply power to the motor of the vibration mechanism 320 in such a way that vibration is at a constant or varying frequency. Variable vibration frequencies may be better suited for the removal of certain debris/residue. Vibrations may be ultimately transferred into the wiper assembly. Vibrating the wiper causes residue/debris to be knocked off by the oscillation and/or by impacting the windshield. Earlier references to activating the vibration mechanism may be inferences to the electrical communication of the power supply to the motor of the vibration mechanism 320. Activating the vibration mechanism may be referred to as an operating state.

A bottom cover 340 is coupled to the base 330. The coupling between the bottom cover 340 and the base 330 may be water-tight, a hermetic seal, or moisture resistant. For example, the coupling between the bottom cover 340 and the base may include an interference fit, threaded fit, or the like and may optionally include a gasket, o-ring, or seal.

A top cover 310 defines at least a portion of a compartment housing or containing the vibration mechanism 320 and an unbalanced weight 370 of the vibration mechanism 320. In addition, the top cover 310 includes a conduit 380 for the entrance of external wires. These wires may be for the introduction of power for the motor of the vibration mechanism 320 from the control device. The conduit 380 defines a lumen 382. The lumen 382 may be for the passage of wires therethrough. In some embodiments, the top cover 310 functions to cover or contain internal components (e.g., vibration mechanism, wires, etc.). In further embodiments, the conduit 380 extending from the top cover 310 functions as a passageway or a junction for electrical wires. With these responsibilities, the top cover 310 may not experience the type of stress and cyclical loading experienced by the base 330. The lower stress that may be experienced by the top cover 310 may allow for the use of lower strength materials, such as plastics, polymers or any other similar material known in the art. These more effective materials include weather resistant properties that most alloys do not have without a proper coating (e.g., painting, powder coating, etc.). By avoiding the coating step during manufacture of the top cover 310, other benefits, besides increased ease of production, are achieved. For example, when coating the top cover 310, excess coating material may build up in the lumen 382 defined by the conduit 380. The excess coating material may cause issues for the assembly of the device, which may then increase the risk of damaging the part during the removal of the excess coating material in the lumen 382.

Figure 4:
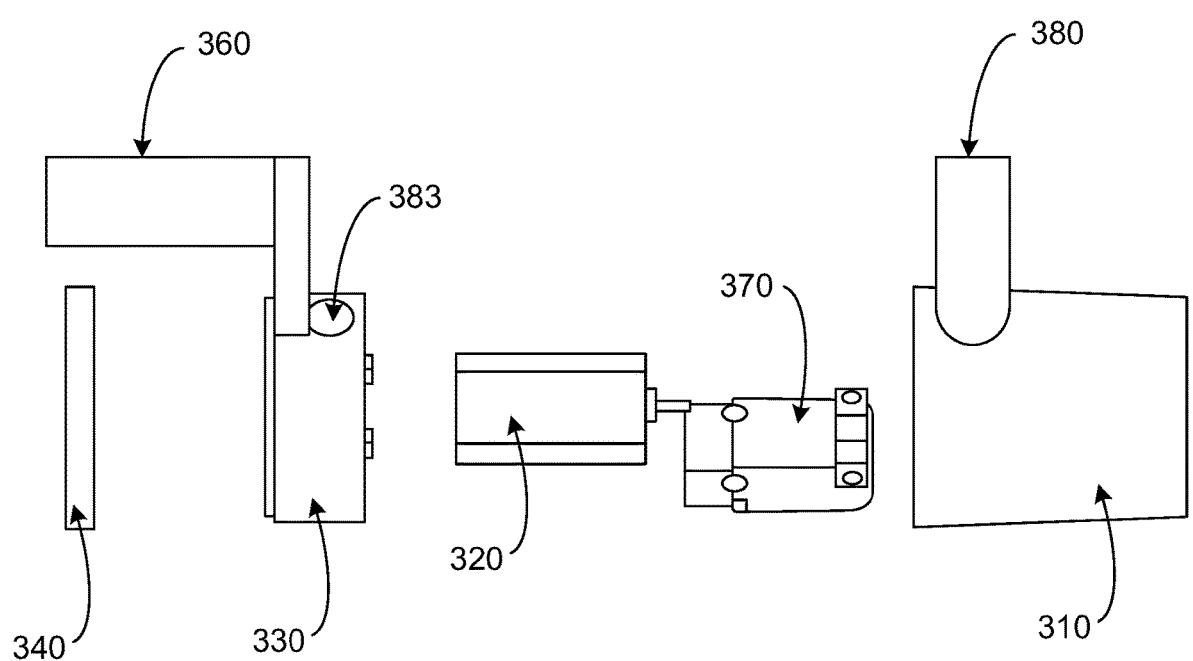
FIG. 4 shows a side exploded view of the device of FIG. 3.

FIG. 4 illustrates an exploded perspective view of an embodiment of the wiper attachment device 20 assembly of FIG. 3. In this illustrated embodiment, the conduit 380 is depicted, integrally formed in the top cover 310. The conduit 380 may extend from the top cover 310 and/or be extruded from the top cover 310 for the fastening of conduit to the top cover 310. In some embodiments, the conduit 380 may have a male or a female thread integrally formed into the extruded conduit 380. A male or a female thread extruded from or in the conduit 380 may be used for the fastening of conduit via conduit fittings. Conduit may be used for mechanical protection of electrical wires passing from the control device 30 to the wiper attachment device 20. In some embodiments, the conduit and associated fittings may be liquid-tight and/or flexible. In further embodiments, a cable gland may be fastened to the threads of the conduit 380. In these embodiments, the cable gland may be used to make a water-tight seal on the electrical wires coming from the control device 30, thus completing the liquid-tight seal of the wiper attachment device 20. In some embodiments, the base 330 may define aperture 383. When the assembly is assembled, the aperture 383 of the base 330 is aligned concentrically or semi-concentrically with the conduit 380 of the top cover 310. Arranging the conduit 380 and the aperture 383 of the base 330 in this way allows the passage of electrical wires into the motor of the wiper attachment device 20.

Figure 5:
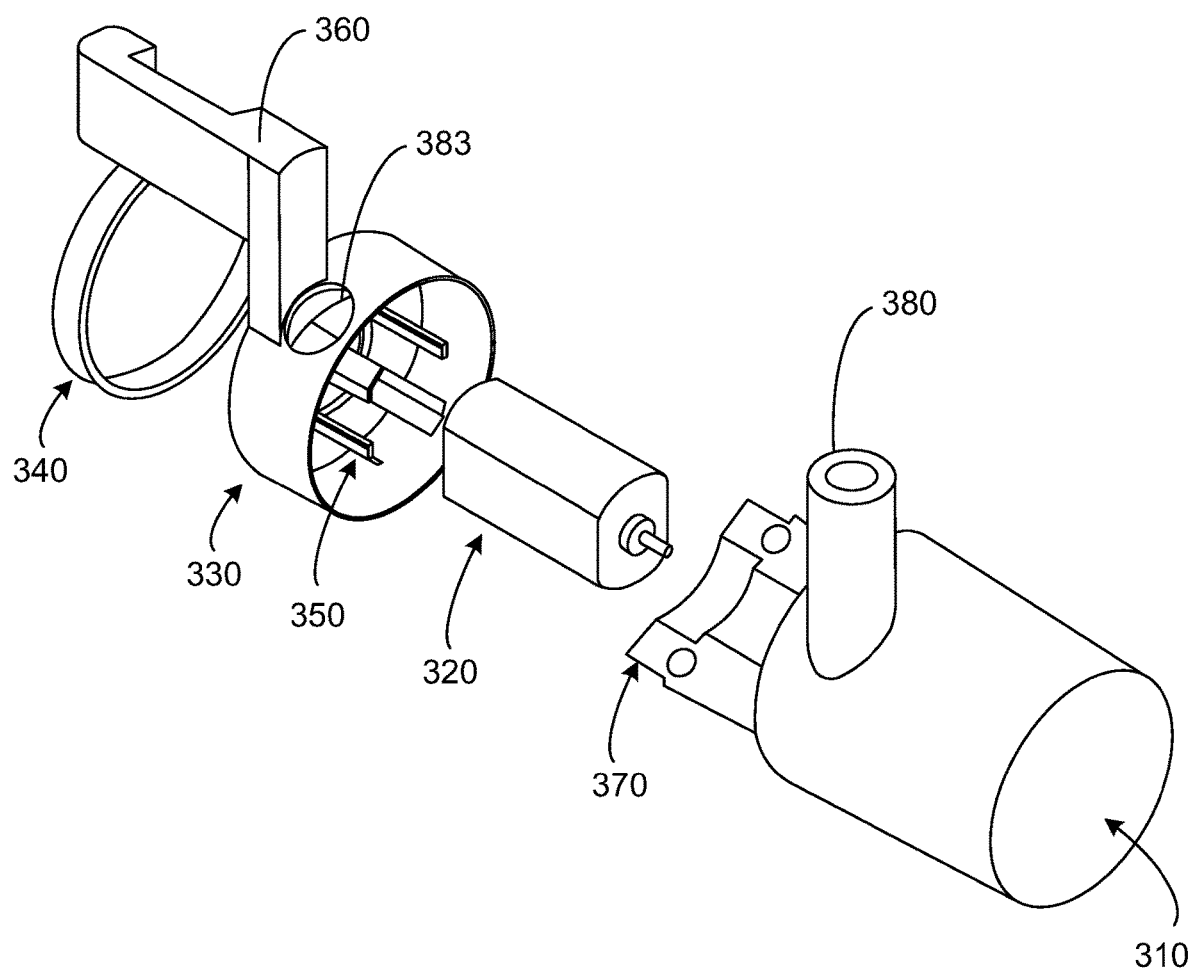
FIG. 5 shows a perspective exploded view of the device of FIG. 3.

FIG. 5 illustrates a perspective exploded view of an embodiment of the wiper attachment device 20. In this embodiment, the securing mechanism 350 of the base 330 is shown. The securing mechanism 350 acts to secure and stabilize the vibration mechanism 320. Securing and stabilizing the vibration mechanism 320 becomes especially important when the vibration mechanism 320 is activated. In an embodiment, the vibrational forces generated by the unbalanced weight 370 may be arrested by the securing mechanism 350. Some embodiments include a securing mechanism 350 with two or more braces that run parallel to the longitudinal axis of a motor of the vibration mechanism 320, such that the motor of the vibration mechanism 320 fits securely within. The securing mechanism 350 may comprise one or more of: a plurality of stanchions, an adhesive, or a keyed interface complementary to a shape of the vibration mechanism to secure the at least a portion of the vibration mechanism to the base 330.

Figure 6:
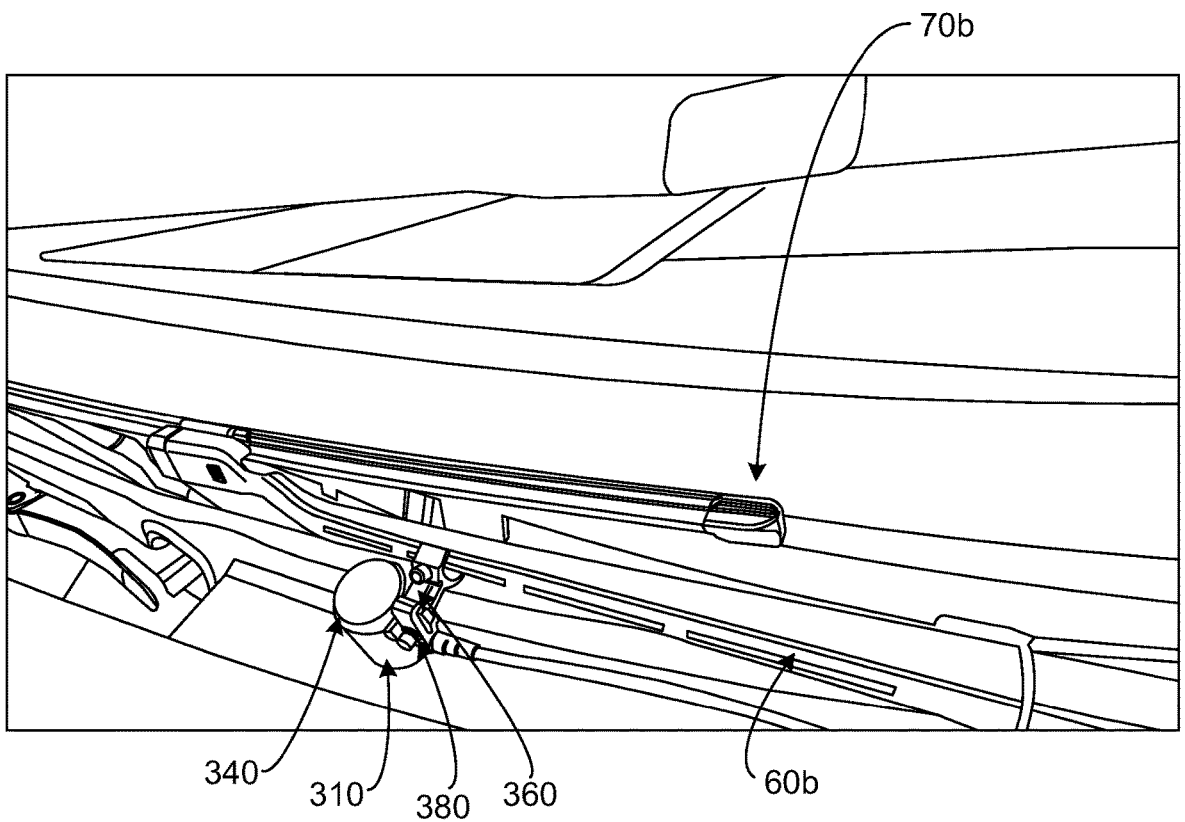
FIG. 6 shows the device of FIG. 3 installed on a wiper arm.

FIG. 6 illustrates an embodiment of the wiper attachment device 20 installed on a wiper arm 60b, which is supporting a wiper 70b. FIG. 6 demonstrates an embodiment with a clamp 360 securing a base 330 to a wiper arm 60b. Additionally, this embodiment illustrates an extruded conduit 380 with liquid-tight flexible conduit fastened to it and the conduit leading into the engine compartment and ultimately to the control device 30 (not shown).

Figure 7:
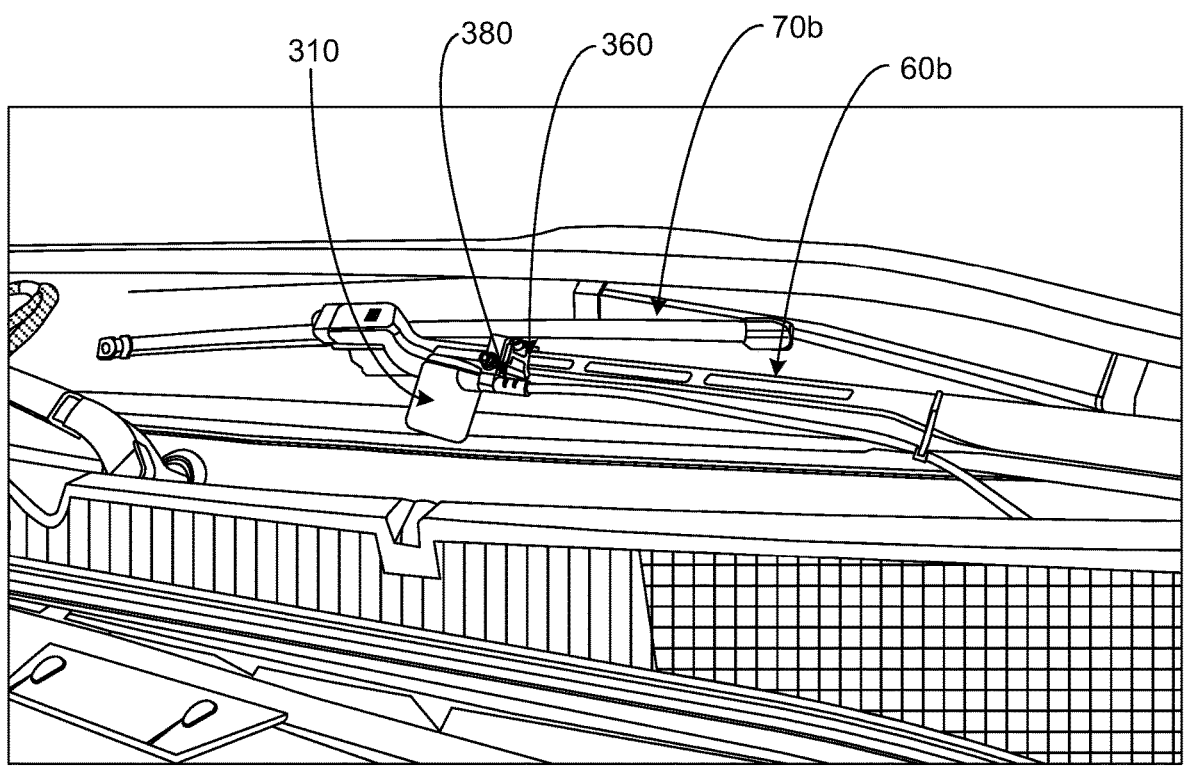
FIG. 7 shows the device of FIG. 3 installed on a wiper arm and the electrical connection to the control device.

FIG. 7 illustrates an embodiment of the wiper attachment device 20 installed on a wiper arm 60b, which is supporting a wiper 70b. The embodiment includes a clamp 360 securing a base 330 to a wiper arm 60b. Additionally, this embodiment illustrates an extruded conduit 380 with liquid-tight flexible conduit fastened to it and the conduit leading into the engine compartment and ultimately to the control device 30 (not shown).

Methods

Figure 8:
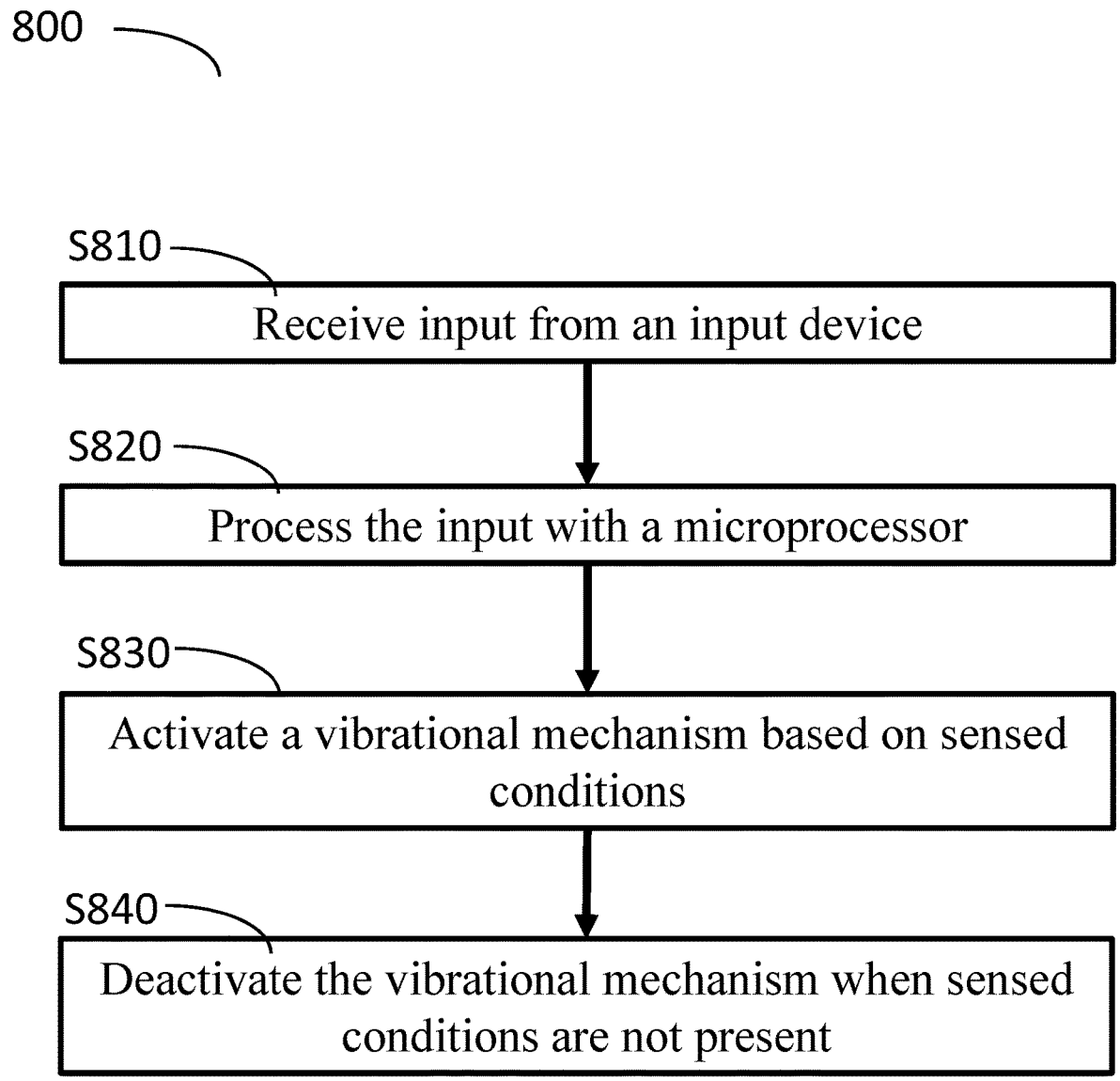
FIG. 8 shows an embodiment of a method for practicing an embodiment of the device.

Turning now to FIG. 8, which shows a method 800 for reducing or removing debris from a wiper assembly. The method 800 includes: receiving input from an input device at block 5810; processing the input with a microprocessor at block 5820; activating a vibrational mechanism based on sensed conditions at block S 830; and deactivating the vibrational mechanism when sensed conditions are not present at block 5840. The methods described herein function to remove material from a wiper blade. The methods described herein are used for the automotive industry, but can additionally, or alternatively, be used for any suitable applications. The methods can be configured and/or adapted to function for any suitable surface, for example screens, windshields, windows, or the like.

As shown in FIG. 8, an embodiment of a method 800 for reducing or removing debris from a wiper assembly includes block 5810, which recites receiving an input from an input device. For example, an input device may include a key fob, a remote, or a computing device having an application stored thereon (e.g., a mobile computing device). The input device receives an input and transmits the input to a control device. Additionally, an input device may be one or more sensors that measure properties indicative of debris or residue presence. Block 5820 recites that the input is processed by a microcontroller, via programmable logic. Block 5830 comprises activating a vibrational mechanism based on sensed conditions. The method may repeat such that the system re-evaluates the foregoing conditions, and when they are no longer present, deactivates the vibrational mechanism at block S 840.

An input may comprise a user input, for example a text input into an application, a verbal input into a voice-enabled application, a tactile input, for example depressing a button on a key fob or other input device, etc.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor on the control device and/or computing device. The computer-readable medium can be stored on any suitable computer-readable media such as RAMs, ROMs, flash memory, EEPROMs, optical devices (e.g., CD or DVD), hard drives, floppy drives, or any suitable device. The computer-executable component is preferably a general or application-specific processor, but any suitable dedicated hardware or hardware/firmware combination can alternatively or additionally execute the instructions.

As used in the description and claims, the singular form "a", "an" and "the" include both singular and plural references unless the context clearly dictates otherwise. For example, the term "blade" may include, and is contemplated to include, a plurality of blades. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for removing material from a wiper blade, the system comprising:
    a vibration mechanism;
    a housing comprising:
    a top cover defining a conduit extending from the top cover, wherein the conduit defines a lumen,
    a base comprising a securing mechanism for at least a portion of the vibration mechanism, wherein the base defines a base aperture that is configured to align with the lumen of the conduit when the base is coupled to the top cover, and
    a bottom cover coupled to the base and the top cover, wherein the coupling between the bottom cover and the top cover comprises a water-tight seal; and
    a control device comprising:
        a sensor configured to output a signal indicative of an acceleration of a wiper assembly during actuation, wherein the sensor is coupled to, disposed on, or integrated into the housing,
        a microcontroller configured to receive the signal from the sensor, determine an acceleration profile of the wiper assembly, and output a change in an operating state of the vibration mechanism based on the determined acceleration profile of the wiper assembly, and
        a power source in electrical communication with the vibration mechanism via an electrical connection, and the microcontroller,
    wherein the vibration mechanism is configured to be contained in the housing and comprises the electrical connection that extends from the vibration mechanism through the base aperture and the lumen of the conduit in the top cover to the power source.

2. The system of claim 1, wherein the vibration mechanism comprises a motor and an eccentric rotating mass.

3. The system of claim 1, wherein the vibration mechanism comprises one of: a linear resonant actuator, a solenoid actuator, or a piezoelectric element.

4. The system of claim 1, further comprising an input device configured to generate an input signal, wherein the control device further comprises an antenna configured to receive the input signal.

5. The system of claim 4, wherein the input device comprises a remote, a key fob, or a mobile computing device comprising an application installed thereon.

6. The system of claim 1, wherein the operating state comprises one of: activating the vibration mechanism, deactivating the vibration mechanism, or changing a frequency of vibration caused by the vibration mechanism.

7. The system of claim 1, further comprising a clamp configured to secure the housing to a wiper arm coupled to the wiper blade.

8. The system of claim 7, wherein the clamp is coupled to the bottom cover opposite an end of the bottom cover that is coupled to the top cover.

9. The system of claim 8, wherein the base comprises a first concave side comprising the securing mechanism and a second side, opposite the first concave side, coupled to the bottom cover.

10. The system of claim 9, wherein the securing mechanism comprises one or more of: a plurality of stanchions, an adhesive, or a keyed interface complementary to a shape of the vibration mechanism configured to secure the at least a portion of the vibration mechanism to the base.

11. A system for removing material from a wiper blade, the system comprising:
    a vibration mechanism;
    a housing comprising:
    a top cover defining a passage connected to a conduit extending from the top cover, and
    a base comprising a securing mechanism for at least a portion of the vibration mechanism, wherein the base defines a base aperture that is configured to align with the passage connected to the conduit when the base is coupled to the top cover, and wherein the base is configured to be coupled to the top cover;
    a first sensor configured to output a signal indicative of an acceleration of a wiper assembly during actuation, wherein the first sensor is coupled to, disposed on, or integrated into the housing;
    a microcontroller configured to receive the signal from the first sensor, determine an acceleration profile of the wiper assembly, and output a change in an operating state of the vibration mechanism based on the determined acceleration profile of the wiper assembly; and
    a power source in electrical communication with the vibration mechanism via an electrical connection of the vibration mechanism, and the microcontroller,
    wherein the vibration mechanism is configured to be contained in the housing and comprises the electrical connection that extends from the vibration mechanism through the base aperture and the passage in the top cover and through the conduit in the top cover to the power source.

12. The system of claim 11, wherein the vibration mechanism comprises a motor and an eccentric rotating mass.

13. The system of claim 11, wherein the vibration mechanism comprises one of: a linear resonant actuator, a solenoid actuator, or a piezoelectric element.

14. The system of claim 11, further comprising an antenna configured to receive an input from an input device, wherein the input device comprises a remote, a key fob, or a mobile computing device comprising an application installed thereon.

15. The system of claim 11, wherein the operating state comprises one of: activating the vibration mechanism, deactivating the vibration mechanism, or changing a frequency of vibration caused by the vibration mechanism.

16. The system of claim 11, further comprising a clamp coupled to the base opposite an end of the base that is coupled to the top cover, wherein the clamp is configured to secure the housing to a wiper arm coupled to the wiper blade.

17. The system of claim 11, wherein the securing mechanism comprises one or more of: a plurality of stanchions, an adhesive, or a keyed interface complementary to a shape of the vibration mechanism configured to secure the at least a portion of the vibration mechanism to the base.

18. The system of claim 11, further comprising a second sensor disposed on or integrated in the housing and in electrical communication with the microcontroller, wherein the second sensor is configured to detect moisture; and output a second sensor signal to the microcontroller.

19. The system of claim 18, wherein the microcontroller is configured to receive the second sensor signal from the second sensor; and automatically output an activation signal to the vibration mechanism.

20. The system of claim 18, wherein the second sensor is an electromagnetic sensor or an electrical resistance sensor.

\* \* \* \* \*